No. 821,292. PATENTED MAY 22, 1906.
A. H. HOYT.
ELECTRICAL MEASURING INSTRUMENT.
APPLICATION FILED JUNE 7, 1904.
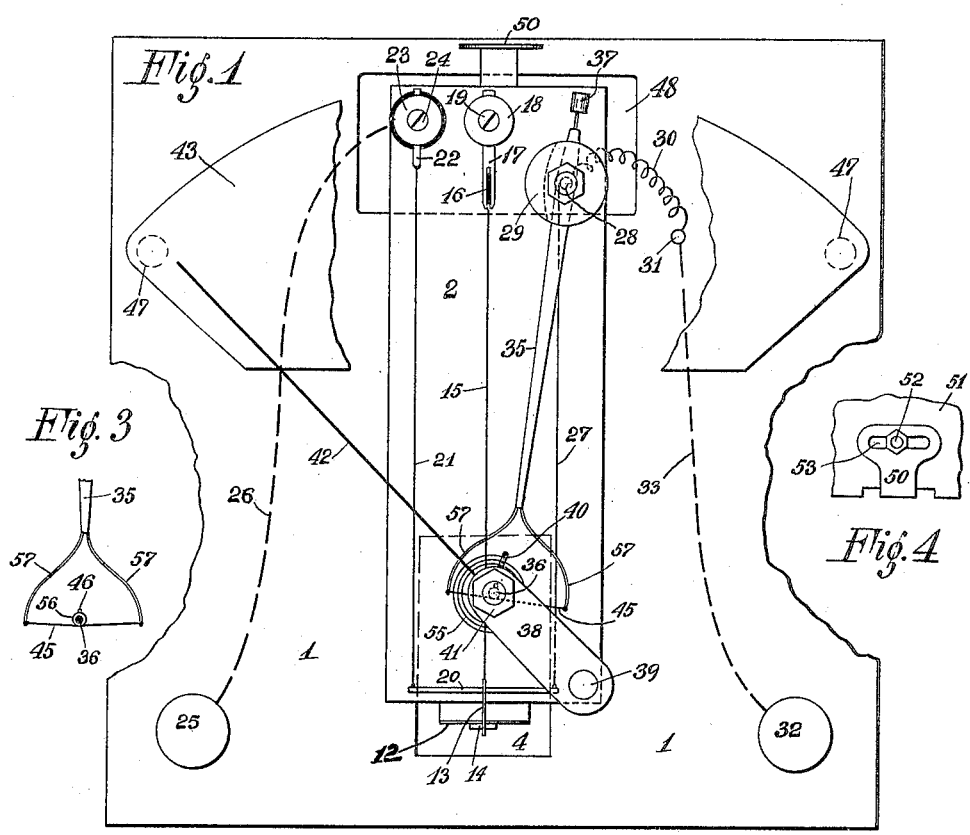
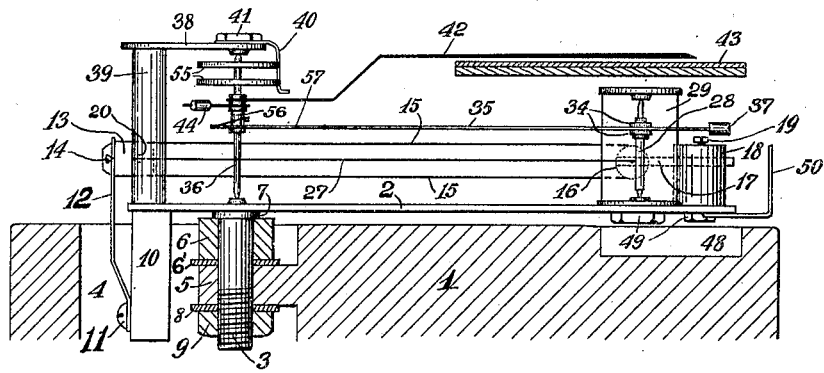
WITNESSES:
L. R. Sager.
Julian T. Wooster.
INVENTOR
Adrian H. Hoyt
BY
C. V. Edwards
ATTORNEY

UNITED STATES PATENT OFFICE.

ADRIAN H. HOYT, OF PENACOOK, NEW HAMPSHIRE, ASSIGNOR TO WHITNEY ELECTRICAL INSTRUMENT COMPANY, A CORPORATION OF NEW YORK.

ELECTRICAL MEASURING INSTRUMENT.

No. 821,292.   Specification of Letters Patent.   Patented May 22, 1906.

Application filed June 7, 1904. Serial No. 211,479.

*To all whom it may concern:*

Be it known that I, ADRIAN H. HOYT, a citizen of the United States, residing at Penacook, in the county of Merrimack and State of New Hampshire, have invented certain new and useful Improvements in Electrical Measuring Instruments, of which the following is a full, clear, and exact specification.

My invention relates to electrical measuring instruments, and particularly to that type for measuring current or voltage in which the movement of the pointer is determined by the expansion of a wire heated by the current passing through the instrument.

The object of my invention is the production of an instrument which will have a high degree of accuracy, be unaffected by changes in temperature of the surrounding medium or by neighboring magnetic fields, be portable and capable of use in any convenient position, and overcome various objections to instruments previously used.

My invention will be understood by reference to the following description and accompanying drawings, which show the preferred form of my invention, and will be more particularly set forth in the claims.

Figure 1 is a plan view of an instrument embodying my invention with the casing removed and part of the scale-plate broken away. Fig. 2 is a side view of the working parts with the scale-plate and base in section, and Figs. 3 and 4 are details.

The base is indicated at 1 and, if desired, the ammeter-shunt or the high resistance may be located therein, according to whether the instrument is to be used as an ammeter or as a voltmeter. All of the working parts of the instrument are mounted upon a brass plate 2, which plate is capable of being turned on the axis of the stud 3, which is fixed to the plate 2. An opening 4 is provided in the base 1, and other parts of the base are also cut away, leaving a tongue 5, through which the stud 3 passes. The stud 3 also passes through a collar 6 and washer 6', which are placed above the tongue 5, and the collar 6 engages the flange 7 of stud 3. The stud 3 also passes through a washer 8 on the under side of tongue 5, the whole being retained in place by the nut 9. The plate 2, stud 3, and nut 9 are free to turn as a whole for a purpose to be afterward explained.

A metal block 10 is secured to the under side of the plate 2 and projects into the opening 4. Fixed to block 10 by screw 11 is a flat spring 12, which extends above the end of the plate 2. A thin flexible metal strip 13 is supported in a narrow vertical slot in the spring 12 and retained from being pulled out in one direction by the pin 14. The pin 14 is wedge-shaped, as shown, forming a knife-edge, which engages a notch on the outer face of spring 12. A small rod 20 is fixed to the strip 13 and passes through the same at right angles thereto.

A wire 15 is secured at one end to the top edge of strip 13 and passes to a support 16. A second wire 15 returns from the support 16 and is fixed at the other end to the lower edge of strip 13. The support 16 is in the form of a small disk, having a grooved periphery and is carried by a pin 17, which passes through the post 18, fixed to plate 2. A screw 19 passes into post 18 and engages the pin 17, so as to clamp the same in any position desired. The tension upon the wires 15 is therefore adjustable. In the form shown the two wires 15 form in reality a single wire, which passes around the periphery of support 16; but the wires 15 may be secured to the support 16 in any convenient manner and form two independent wires. The tension upon the wires 15 is maintained equal by the support of the strip 13 on the knife-edge of pin 14.

At one end of the beam or rod 20 is fastened a wire 21, which is connected at the opposite end to a pin 22. This pin passes through the post 23 and is clamped in any desired position by the screw 24, which enters the post. The post 23 is insulated from the plate 2 by a suitable bushing and washers, and connection is made in any convenient manner from terminal 25 of the instrument to the post 23, as indicated by the dotted line 26. To the opposite end of the rod 20 is secured a second wire 27, which passes around the shaft 28 and has one end fixed thereto. The shaft is pivoted in upper and lower jewels, carried by the support 29, which is fixed to the plate 2. A light flexible wire 30 makes contact with the shaft 28 and pin 31, which pin passes through the base 1 and connection made therefrom to the terminal 32, as indicated by the dotted line 33.

Secured to the shaft 28 by the two nuts 34 is a light arm 35, which imparts movement to a second pivoted shaft 36. The arm is counterbalanced by an adjustable weight 37. The shaft 36 is pivoted between a jewel seated in the plate 2 on a line of the axis of stud 3 and a jewel carried by arm 38, which arm is supported by the post 39. Fixed to the shaft 36 are the inner ends of two reversely-wound springs 55, the outer ends of which are fixed to an adjustable abutment 40, which is clamped between the nut 41 and arm 38. Also fixed to the shaft 36 is an indicating-needle 42, which moves over a suitably-calibrated scale-plate 43. The needle is counterbalanced by the adjustable weight 44. On the shaft is also mounted a small sleeve 56, fixed to the shaft by screw 46, and a fiber 45 passes around said sleeve and has its end connected to the two parts 57 of the arm 35. The parts 57 are resilient and take up any looseness in the fiber. The fiber is fixed to the sleeve at one point by being wound around the screw 46 or otherwise, so as to prevent slipping of the thread with reference to the shaft.

The scale-plate 43 is supported from the base 1 by posts 47. An opening 48 is provided in the base 1 to allow clearance for the nuts 49 on the bottom of the plate 2, which secure the posts 19 23 and support 29 in position. Soldered or otherwise secured to the plate 2 is a thin metal sheet 50, turned up at right angles to engage the outside of the case 51, a portion of which is shown in Fig. 4. A screw 52 passes through a slot 53 in the piece 50 and into the casing and clamps the metal piece 50 to the casing in any desired position.

The springs 55 are adjusted so as to exert a constant tendency to move the pointer to the maximum limit of the instrument, and by turning the abutment 40 the resultant force exerted by the two springs may be varied. When no current is passing through the instrument, the springs 55 cannot turn the pointer above the zero-point of the scale, as such movement is opposed by the fiber 45, arm 35, shaft 28, wire 27, rod 20, wire 21, and post 23. The path of the current is from terminal 32, through connection 33 to pin 31, connection 30 to shaft 28, and as said shaft is suitably insulated from plate 2, as by the jewel-bearings, the current passes to wire 27, rod 20, wire 21, pin 22, to post 23, which is insulated from plate 2, and then out by connection 26 to terminal 25. The current in passing through the wires 27 and 21 causes them to expand, the amount of which expansion depends upon the strength of the current and is therefore a measure of the current strength. Any expansion of wires 27 and 21 is taken up by the turning of shaft 28 by the force of the springs 55. This slight turning of shaft 28 is greatly amplified in the movement of the shaft 36, and consequently of the indicating-needle 42, by the connection of the arm 35 and fiber 45. It is therefore evident that the deflection of the needle will depend upon the expansion of wires 27 and 21, and consequently indicate the strength of the current. When used as a voltmeter, the instrument will be connected in series with a high resistance, and when used as an ammeter will be connected in parallel with a low-resistance shunt.

The additional wires 15 are provided in order to compensate for changes in temperature of the surrounding medium. The wires 15, 21, and 27 are all made of the same material and are substantially the same in length. Hence any expansion of wires 27 and 21 due to increase of temperature of the air will be accompanied by an equal expansion of wires 15, which will be taken up as a whole by the spring 12, and no turning of shaft 28 will result. Similarly the lowering of temperature of the whole instrument causes an equal contraction of wires 21, 15, and 27, which contraction is permitted by the yielding of spring 12. All changes in temperature of the surrounding medium are therefore accurately compensated for.

By my invention the needle may be quickly adjusted to the zero-point of the scale. As above explained, the scale-plate 43 is fixed to the base 1, as is also the outside casing 51, partly indicated in Fig. 4. All working parts of the instrument, however, are mounted upon plate 2, pivoted on the base by stud 3, the shaft 36 and stud 3 having the same axis. By loosening the screw 52 the plate 2 may be turned slightly and the needle brought to the zero-point, and then plate 2 is fixed in that position by tightening the screw 52. This arrangement for adjusting the instrument to give a proper zero reading has proved in practice to be very desirable and may, of course, be applied to instruments of various types.

It is evident that my improved instrument may be used as a direct or alternating current instrument, and it makes no difference in what direction the current flows when used as a direct-current instrument. The instrument is also unaffected by the presence of a magnetic field of any strength.

Although I have shown and described a specific embodiment of my invention, it is evident that various changes in construction may be made without departing from the spirit of the invention and scope of the claims.

Having thus described my invention, I declare that what I claim as new, and desire to secure by Letters Patent, is—

1. In an electrical measuring instrument, the combination of a base, a support and all the working parts carried thereby, said support being movably mounted on said base, and a scale-plate fixed to said base, substantially as described.

2. In an electrical measuring instrument, the combination of a base, a support and all the working parts carried thereby, said support being pivoted on said base, and a scale-plate fixed to said base, substantially as described.

3. In an electrical measuring instrument, the combination of a base, a support and all the working parts carried thereby, said support being pivoted on said base, the axis of the pivoted support coinciding with the axis of the shaft carrying the indicating-needle, and a scale-plate fixed to said base, substantially as described.

4. In an electrical measuring instrument, the combination of a base, a support normally fixed during operation and having certain movable indicating parts carried thereby, said support being movably mounted on said base, and a scale-plate fixed to said base, substantially as described.

5. In an electrical measuring instrument, the combination of a support, a spring fixed to said support, a flexible strip pivotally mounted on said spring, compensating wires extending from said strip to a fixed support, a rod carried by said strip and at right angles thereto, a wire extending from one end of said rod to a fixed support, a second wire connected at the other end of said rod, and means connected with the opposite end of said second wire for taking up and indicating the expansion of said current-carrying wires, substantially as described.

6. In an electrical measuring instrument, the combination with a current-carrying wire, of means for multiplying the expansion of said wire, comprising a movable element, an arm carried by said movable element having two extensions, a pivoted shaft, and a connection between said two extensions and said pivoted shaft.

7. In an electrical measuring instrument, the combination with a current-carrying wire, of means for multiplying the expansion of said wire, comprising a movable element which takes up the expansion of said wire, two extensions carried by said element, a pivoted shaft, and a fiber connecting said two extensions and said pivoted shaft.

8. In an electrical measuring instrument, the combination with a current-carrying wire, of means for multiplying the expansion of said wire comprising a movable element which takes up the expansion of said wire, two extending parts carried by said element, a pivoted shaft, and a fiber from opposite sides of said pivoted shaft connected to said parts.

9. In a hot-wire instrument, the combination of an expansible wire, and means for multiplying the expansion of said wire comprising a movable element which maintains tension on said wire, two extensions carried by said element, at least one of said extensions being yieldable with reference to the other, a pivoted shaft, and a flexible connection between said extensions and said shaft.

10. In a hot-wire instrument, the combination of an expansible wire, and means for multiplying the expansion of said wire comprising a movable element which maintains tension on said wire, two extensions carried by said element, at least one of said extensions being yieldable with reference to the other, a pivoted shaft, and a fiber connected from opposite sides of said shaft to said extensions.

11. The combination of a current-carrying wire, a compensating wire, a pivoted shaft to which shaft said current-carrying wire is mechanically connected, and means for causing said pivoted shaft to turn and take up the expansion of said current-carrying wire, substantially as described.

12. The combination of a current-carrying wire, a compensating wire, a pivoted shaft to which shaft said current-carrying wire is mechanically connected, means for causing said pivoted shaft to turn and take up the expansion of said current-carrying wire, and means for multiplying the movement of said pivoted shaft, substantially as described.

In testimony whereof I affix my signature in presence of two witnesses.

ADRIAN H. HOYT.

Witnesses:
  HORACE B. SHERBURNE,
  ROBERT D. NORSE.